United States Patent
Guckert et al.

(10) Patent No.: US 7,132,629 B2
(45) Date of Patent: Nov. 7, 2006

(54) HEAT-CONDUCTING PLATE OF EXPANDED GRAPHITE, COMPOSITE AND METHOD FOR PRODUCTION

(75) Inventors: Werner Guckert, Baar (DE); Richard Neuert, Hohenreichen/Wertingen (DE); Wolfgang Kienberger, Thierhaupten (DE); Christian Kipfelsberger, Naila (DE)

(73) Assignee: SGL Carbon AG, Wiesbaden (DE)

( * ) Notice: Subject to any disclaimer, the term of this patent is extended or adjusted under 35 U.S.C. 154(b) by 0 days.

(21) Appl. No.: 10/931,422

(22) Filed: Sep. 1, 2004

(65) Prior Publication Data

US 2005/0051538 A1    Mar. 10, 2005

(30) Foreign Application Priority Data

Sep. 4, 2003 (DE) ................. 103 41 255

(51) Int. Cl.
*H05B 3/44* (2006.01)
(52) U.S. Cl. ........................ 219/544; 219/538
(58) Field of Classification Search ............... None
See application file for complete search history.

(56) References Cited

U.S. PATENT DOCUMENTS

| | | | |
|---|---|---|---|
| 3,404,061 A | 10/1968 | Shane et al. | |
| 4,659,912 A * | 4/1987 | Derbyshire | ........... 219/535 |
| 5,180,459 A | 1/1993 | Bauer et al. | |
| 5,194,198 A | 3/1993 | Von Bonin et al. | |
| 5,247,005 A | 9/1993 | Von Bonin et al. | |
| 5,288,429 A | 2/1994 | Von Bonin et al. | |
| 5,308,703 A | 5/1994 | Tsujimoto et al. | |
| 6,667,100 B1 * | 12/2003 | Rutherford et al. | ......... 428/408 |

FOREIGN PATENT DOCUMENTS

| | | |
|---|---|---|
| DE | 40 16 710 A1 | 11/1991 |
| DE | 691 05 246 T2 | 1/1992 |
| DE | 691 08 185 T2 | 6/1992 |
| DE | 41 17 074 A1 | 11/1992 |
| DE | 41 17 077 A1 | 11/1992 |
| DE | 41 42 261 A1 | 6/1993 |
| DE | 195 38 686 A1 | 4/1997 |
| DE | 196 00 228 A1 | 7/1997 |
| DE | 196 22 788 A1 | 12/1997 |
| DE | 198 02 230 A1 | 7/1999 |
| DE | 199 23 937 A1 | 12/1999 |
| DE | 100 49 230 A1 | 4/2002 |

* cited by examiner

*Primary Examiner*—Thor S. Campbell
(74) *Attorney, Agent, or Firm*—Laurence A. Greenberg; Werner H. Stemer; Ralph E. Locher

(57) ABSTRACT

Lightweight heat-conducting plates of compressed expanded graphite material have layer planes which are preferably disposed so as to be parallel to the surface so that heat conduction in a lateral direction is preferred to heat conduction perpendicular to the plate plane. The heat-conducting plates are suitable for the transmission of heat of floor-heating, wall-heating, ceiling-heating and other flatly disposed heating systems and air-conditioning ceilings, for the transmission of heat and the dissipation of heat in buildings, automobiles, machines, installations and containers. The heat-conducting plates are dimensionally stable without the addition of binder and aggregates and can be produced in a continuous process. A composite component having at least one heat-conducting plate and a method for production of heat-conducting plates are also provided.

41 Claims, 2 Drawing Sheets

HEAT-CONDUCTING PLATE OF EXPANDED GRAPHITE, COMPOSITE AND METHOD FOR PRODUCTION

BACKGROUND OF THE INVENTION

Field of the Invention

The present invention relates to heat-conducting plates made from expanded graphite without binding agents, having preferred heat conduction parallel to the plate surface. The invention also relates to a composite component having at least one heat-conducting plate and to a method for production. The heat-conducting plates in accordance with the invention are suitable, inter alia, for the transmission of heat of floor-heating, wall-heating, ceiling-heating and other flatly disposed heating systems and air-conditioning ceilings. In addition to those applications in building engineering, the heat-conducting plates in accordance with the invention can be used for the transmission of heat and dissipation of heat in automobiles, machines, installations and temperature-controlled containers, for example for preserving foodstuffs.

Special heat-conducting heating layers are used in conjunction with floor-heating, wall-heating and ceiling- heating systems, in order to achieve comfortable room air conditions. Conductive flooring plaster, building plaster and other heating layers that contain additives made from graphite in order to improve heat conductivity are known from German Published, Non-Prosecuted Patent Applications DE 196 22 788 A1, DE 100 49 230 A1, DE 198 02 230 A1, DE 195 38 686 A1 and DE 196 00 228 A1.

In German Published, Non-Prosecuted Patent Application DE 41 17 077 A1, corresponding to U.S. Pat. No. 5,288,429, German Published, Non-Prosecuted Patent Application DE 41 17 074 A1, corresponding to U.S. Pat. No. 5,247,005, and German Published, Non-Prosecuted Patent Application DE 40 16 710 A1, corresponding to U.S. Pat. No. 5,194,198, it has been proposed that molded bodies made from expanded graphite be used in the construction of floor-heating systems and other heating installations as well as in devices for sound-insulation and electromagnetic shielding. Those molded bodies are produced in such a way that either:

- expandable graphite is incompletely expanded in a fluidized bed or already in the final mold while subject to a moderate heat supply and subsequently the expansion is brought to an end at an increased temperature in a mold, or
- expandable graphite that has been incompletely expanded while subject to a moderate heat supply is pressed in a mold to form a preform and subsequently the expansion is brought to an end in the mold at a comparatively high temperature, or
- a moist preparation of expandable graphite is expanded in a mold while subject to a supply of heat.

The final stage of the expansion is thus in each case effected in the final mold, and after completion of the expansion there is no compacting. The mold must be constructed in such a way that on one hand it is substantially closed so that the material takes on the desired geometry, but on the other hand it permits the escape of air. The molded bodies that are obtained with that method are to be dimensionally stable and have homogeneous density. In preferred variants of the above-mentioned methods, various aggregates and auxiliary substances, in particular binding agents, are added to the expandable graphite.

Since the expansion of the expandable graphite that is uniformly distributed in the mold takes place in all directions in space in the method of production described above, the layer planes of the graphite in the molded bodies do not take on any distinct preferred orientation and the heat conductivity of those molded bodies will therefore hardly be directionally dependent. However, preferred heat conduction in plane is desirable in order to achieve rapid and uniform heat distribution over the surface, for use in connection with flatly disposed heating elements, such as, for example, wall-heating, ceiling-heating or floor-heating systems. Further disadvantages of the prior art described above are the discontinuous method of production and the comparatively high outlay for the production of the ventable molds.

SUMMARY OF THE INVENTION

It is accordingly an object of the invention to provide a heat-conducting plate of expanded graphite, a composite and a method for production, which overcome the hereinaforementioned disadvantages of the heretofore-known products and methods of this general type.

With the foregoing and other objects in view there is provided, in accordance with the invention, a lightweight heat-conducting plate. The heat-conducting plate is formed of binder-free compressed expanded graphite material and has a plate surface with heat conductivity parallel to the plate surface and heat conductivity perpendicular to the plate surface. The heat conductivity parallel to the plate surface is at least 50% higher than the heat conductivity perpendicular to the plate surface.

Therefore, in contrast to the prior art, in accordance with the invention, heat-conducting plates are provided that contain compressed expanded graphite material, in which the heat conduction is preferentially effected along the plate plane. These heat-conducting plates are dimensionally stable without the addition of binder and aggregates.

With the objects of the invention in view, there is also provided a composite, comprising two lightweight heat-conducting plates lying one on top of the other. Pipes for distribution of a fluid heat-carrier medium or wires for an electrical heating system are embedded between the two plates.

With the objects of the invention in view, there is additionally provided a composite component for use in structural engineering. The composite component comprises at least one lightweight heat-conducting plate, and at least one further component selected from wooden boards, gypsum plaster boards, fireclay bricks, tiles, cellular concrete stones or slabs, bricks, lime sandstone, pumice, LIAPOR stones and clinker. LIAPOR is a registered trademark for building materials, such as blocks and stones of expanded clay.

With the objects of the invention in view, there is furthermore provided a building, automobile, machine, installation or container, comprising at least one lightweight heat-conducting plate or at least one composite component. The plate or composite component is used in floor-heating systems, ceiling-heating systems, wall-heating systems and air-conditioning ceiling systems, for transmission and dissipation of heat.

With the objects of the invention in view, there is concomitantly provided a method for the production of lightweight heat-conducting plates. The method comprises compressing continuously supplied expanded graphite material in a pre-compressor between textile bands to form a web. The web is cut to length into lightweight heat-conducting plates having a desired size.

Therefore, a method is set forth with which such heat-conducting plates that are made of expanded graphite can be produced in a continuous manner.

The production of expanded graphite (expanded graphite material) is known, inter alia, from U.S. Pat. No. 3,404,061. In order to produce expanded graphite, graphite-intercalation compounds or graphite salts, for example graphite hydrogen sulfate or graphite nitrate, are heated in a shock-like manner. Thereupon, the volume of the graphite particles is increased by a factor of 200 to 400 and the bulk density drops to 2 to 20 g/l. The so-called expanded graphite material thus obtained is formed of vermiform or concertina-shaped aggregates.

If the completely expanded graphite is compacted under the directional action of a pressure, the layer planes of the graphite are preferably disposed in such a way as to be perpendicular to the direction of action of the pressure, with the individual aggregates hooking up with each other. As a result, planar structures, for example webs or plates, can be produced that are self-supporting without the addition of binders. It is on this effect that is known from the production of graphite foils with a thickness of 0.15 to 3 mm, which is used, for example, as semi-finished products for the production of flat seals, that the production and mode of functioning of the heat-conducting plates in accordance with the invention are based. Due to the directional action of the pressure during the compacting of the expanded graphite material, the heat-conducting plates in accordance with the invention have a structural anisotropy, from which the advantageous anisotropy of certain properties of the heat-conducting plates in accordance with the invention results. Due to the preferred orientation of the graphite layer planes parallel to the plate surface, the heat conduction in the heat-conducting plates in accordance with the invention that is parallel to the surface (that is, in a lateral direction) is preferred to the heat conduction that is perpendicular to the plate surface. Thus, the heat-conducting plates in accordance with the invention combine the heat-conductivity anisotropy that is known from graphite foil with other properties of expanded graphite that are advantageous for the intended applications, such as low weight, high temperature stability, capability of providing electromagnetic shielding, flame-retarding effect, corrosion-resistance and good adaptation to adjacent surfaces.

Other features which are considered as characteristic for the invention are set forth in the appended claims.

Although the invention is illustrated and described herein as embodied in a heat-conducting plate of expanded graphite, a composite and a method for production, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Referring now in detail to the figures of the drawings as a whole, it is noted that typically, the heat-conducting plates in accordance with the invention are between 8 and 50 mm thick. However, plates having thicknesses between 20 and 40 mm are particularly preferred. Typical dimensions for wall, floor and ceiling elements used in structural engineering lie between 100×60 and 300×100 cm. The heat-conducting plates in accordance with the invention are not, however, tied to these dimensions. The length and width can be selected in accordance with the intended application, since the production method does not set any narrow limits. The density of the expanded graphite in the heat-conducting plates in accordance with the invention lies in the range of 0.01 to 0.5 g/cm$^3$, preferably between 0.05 and 0.25 g/cm$^3$. The heat-conducting plates in accordance with the invention therefore meet demands with respect to lightweight plates (bulk density<400 kg/m$^3$) for use in structural engineering.

The heat conductivity of the heat-conducting plates in accordance with the invention in the direction parallel to the plate surface amounts to at least 5.5 W/m*K and in the direction perpendicularly to the plate surface amounts to 3.6 W/m*K. The heat conductivity parallel to the surface is thus at least 50% greater than it is perpendicularly to the surface. The ratio of the heat conductivity parallel to the plate surface to the heat conductivity perpendicularly to the plate surface becomes greater, the more intense the compression of the expanded graphite becomes, that is, the greater the density of the heat-conducting plate becomes.

Figure 1A:
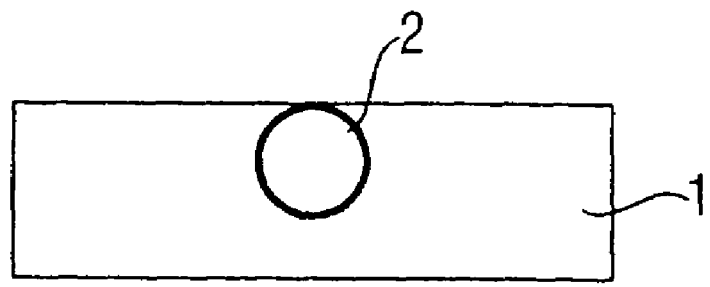
FIGS. 1A–1C are cross-sectional views of a heat-conducting plate in accordance with the invention with pipes for the distribution of a heat-carrier.
Figure 1B:
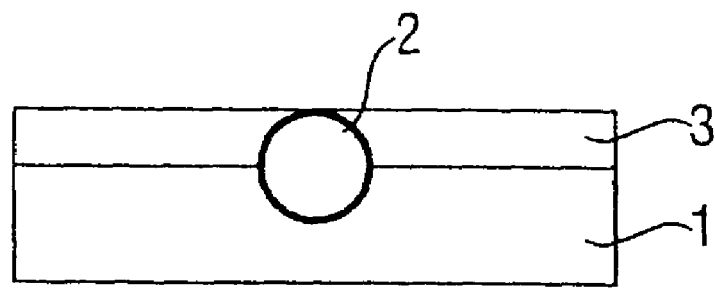

The heat-conducting plate in accordance with the invention can be used, for example, in conjunction with heating systems that utilize a fluid heat-carrier or even in conjunction with electrical heating systems. Pipes made from metal, for example copper, or plastics material, for example polypropylene or cross-linked polyethylene, are provided in the heat-conducting plate in accordance with the invention for the transportation of a fluid heat-carrier, for example water. Pipes made from metal are preferred due to their superior heat transfer. A pipe 2, for example, may be embedded so far in a heat-conducting plate 1 that it ends in such a way that it is flush with the plate surface as is seen in FIG. 1A. As an alternative, the pipe 2 may be partly embedded in the heat-conducting plate 1, that is, a portion of the circumference of the pipe 2 projects out from the surface of the heat-conducting plate 1 like a relief, as is seen in FIG. 1B. A space 3 around the pipes projecting out of the plate surface is filled-in with a suitable material, for example flooring plaster or ground graphite material to which flooring plaster is applied. Heating wires for electrical heating can be laid on the plate surface or pressed into the plate surface.

Figure 1C:
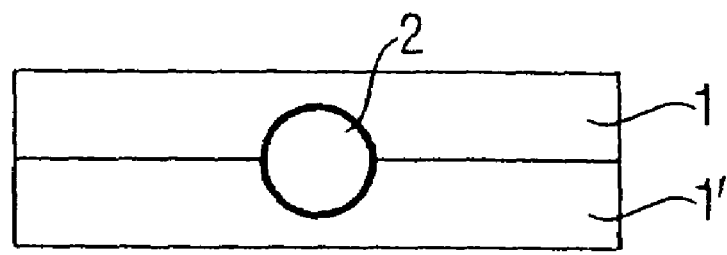

Alternatively, the pipes or heating elements can also be laid between two heat-conducting plates 1 and 1' which are then pressed together, as is seen in FIG. 1C. It has been shown that such composite plates made from two heat-conducting plates of expanded graphite that have been pressed together are very stable; they cannot work loose again at the boundary surface of the plates. Plates of little thickness are preferably used for this variant in order to obtain a composite plate having a thickness which only slightly exceeds the diameter of the embedded pipe. A large distance between the plate surface and the heating element or pipe embedded in the plate is disadvantageous since the heat conduction in the heat-conducting plates in accordance with the invention perpendicularly to the plate plane is less than that parallel to the plate plane. The pipes or heating wires are disposed in such a way that they enable there to be uniform distribution of the heat over the plate surface, for example in a meander-shaped or spiral pattern. For this reason, the heating wires of electrical heating systems are preferably disposed in a grid-shaped or meander-shaped manner. However, due to the high level of heat conductivity of the heat-conducting plate in accordance with the invention, the heating pipes or wires on the surface that is to be heated need not form such a dense grid system as that required in the case of conventional wall-heating, ceiling-heating or floor-heating systems in order to achieve uniform heat distribution. This means that the meshes of the grid, the loops of the meander or the windings of the spiral need be less narrow and fewer grid meshes, meander loops or spiral windings are required per area. As a result, the length of the pipe or heating wire is reduced. The need for pipe material or heating wire can thus be reduced by up to 50% with the heat-conducting plate in accordance with the invention in comparison with wall-heating, ceiling-heating or floor-heating systems without a heat-conducting plate.

Embedding pipes and heating wires in the heat-conducting plate in accordance with the invention takes place either directly at the construction site or else prefabricated components formed of the heat-conducting plates in accordance with the invention and heating wires or pipes are used.

In their simplest embodiment, the heat-conducting plates in accordance with the invention are formed completely of expanded graphite. Aggregates and auxiliary substances, in particular binding agents, are not required for the functioning and dimensional stability of the heat-conducting plates in accordance with the invention. However, the heat conductivity and the mechanical stability of the plates in accordance with the invention can be increased by adding metal and/or carbon fibers to the starting material expanded graphite material. The length of these fibers preferably amounts to 0.2 to 5 mm. The mass fraction of the fibers preferably lies between 5 and 40%.

A further embodiment of the heat-conducting plate in accordance with the invention is distinguished by the heat-conducting plates being completely or partly impregnated with plastics materials, for example resins or thermoplastics, in order to increase the density and the resistance to mechanical and other environmental effects.

Alternatively or in addition, one or more surfaces of the heat-conducting plates can be provided partially or completely with coats of paint, coverings or coatings that perform certain functions such as, inter alia, improvement of the visual effect and facilitation of the ability to handle the heat-conducting plates, fire-protection, effect as a water-vapor barrier, improvement of the heat-insulation and sound-insulation and reduction of the susceptibility to shock.

A covering, for example a layer of varnish, or a layer of plastics material on the plate surface, preferably gives rise not only to an improvement in the visual effect and the ease of handling, but also takes over or assists with certain functions in terms of building physics. For example, an improvement in the electromagnetic shielding is achieved with a metalliferous layer of varnish. A reflective layer of varnish improves the radiation of heat into the adjacent space. These functions are also performed by a coating with a metal foil, for example aluminum foil.

Heat-insulating coatings are formed, for example, of expanded polystyrene, polyurethane or glass wool or rock wool. These are preferably provided on the surface of the heat-conducting plates that is remote from the space to be heated, in order to avoid heat losses.

Further suitable materials for coating the heat-conducting plate in accordance with the invention with a further functional layer, are non-woven fabrics and papers, wood veneers, planar textile materials (woven fabrics, layered fabrics, warp-knitted fabrics, knitted fabrics and the like), perforated sheets as well as films or foils made from plastics material or metal. These laminated composites are particularly advantageous, because they perform additional functions in terms of building physics (see above) in addition to heat conduction and because the mechanical stability of the heat-conducting plate is strengthened by the composite.

The end faces of the heat-conducting plates are preferably coated with suitable materials, for example with wood veneers, plastics or metal bands, for example, for improving the visual effect and reducing the susceptibility to shock.

In order to provide for the further use of the heat-conducting plate in accordance with the invention, in terms of structural engineering, it is advantageous to partly or completely provide at least one surface with a coating that enables there to be a connection to other building materials. Suitable coating materials for this purpose are filler, building-plaster and flooring-plaster and as well as mortar and concrete masses.

The heat-conducting plates in accordance with the invention that are made from expanded graphite are not restricted to a simple flat plate form. The heat-conducting plates in accordance with the invention may contain, for example, structural elements, such as depressions, grooves or beads, knurls and diamond-shaped knurling or grained surfaces, joints and openings and other partial deformations. Furthermore, it is possible to plug into the plates in accordance with the invention pins, angle irons, hollow punches, hooks, anchors or other connecting elements that project from the plate surfaces or end faces and establish a form-locking and/or force-locking connection with adjacent heat-conducting plates or other components. A form-locking connection is one which connects two elements together due to the shape of the elements themselves, as opposed to a force-locking connection, which locks the elements together by force external to the elements.

Complete components, preferably lightweight components, can also be produced from the heat-conducting plates in accordance with the invention in conjunction with standard materials pertaining to structural engineering. These composite components include at least one heat-conducting plate in accordance with the invention and at least one further component, for example wooden boards, gypsum plaster boards, bricks, pumice, lime sandstone, fireclay bricks, tiles, cellular concrete stones or slabs, LIAPOR stones, or clinker.

In order to provide for the production of the above-mentioned composites made from heat-conducting plates of expanded graphite and the above-mentioned laminates or building materials, either the heat-conducting plate or/and the other constituent of the composite is provided with an adhesive or another measure that effects the adhesion of the composite partners, for example filler or building plaster or mortar or another binding agent, on the surface that is to be connected to the other respective material. However, form-locking connections between the individual constituents of the composite are also possible, for example tongue-and-groove connections or snap connections such as, for example, resilient hooks.

The heat-conducting plates in accordance with the invention are produced in a continuous process that includes the following basic steps: (i) pre-compression of the expanded graphite material with optional post-compression to form a web of the desired density and thickness and (ii) reworking processes, if applicable, for coating, shaping and producing material composites. The reworking processes are advantageously effected as far as possible in a continuous manner on the web and only as far as is necessary in a discontinuous manner on the plates cut to length from the web.

In the case of the known procedure for producing graphite foil, the expanded graphite particles are guided over a pre-compressor and pairs of rollers, as a rule two pairs of rollers, with the expanded material being continuously supplied to the pre-compressor. Heating zones in which the material is heated are disposed between the pairs of rollers. The temperatures in these heating regions are approximately 600° C. and are used to displace the air out of the material that is becoming denser. The expanded graphite material both in the pre-compressor and in the pairs of rollers experiences a directional effect of pressure that gives rise to parallel orientation of the layer planes in the graphite particles. It is possible to obtain very thin foils (0.15 to 3 mm thick) with this method.

Such small thicknesses are not required for the heat-conducting plates in accordance with the invention. It has been shown that webs with a distinct orientation of the layer planes of the graphite are already obtained from expanded graphite material with a bulk density in the region of 2.5 to 5 g/l, through the use of pre-compression between textile bands, that is, without further compression by pairs of rollers.

The webs can be processed further, for example impregnated or coated with other materials, when coming directly out of the pre-compressor.

If applicable, carbon or metal fibers are added to the expanded material, which is used as the starting material, before it is passed to the pre-compressor.

However, if a plate thickness of only 10 to 15 mm and/or a high material density (about 0.5 g/cm$^3$) is required, it is expedient to further guide the graphite web, coming continuously from the pre-compressor, between one and/or two pairs of rollers, with heating between the pairs of rollers also being possible thereby. Advantageously, this rolling process is combined with the application of cover layers of other planar materials such as, for example, non-woven fabrics and papers, planar textile materials (woven fabrics, layered fabrics, warp-knitted fabrics, knitted fabrics and the like) as well as films or foils of plastics material or metal.

In the following stage of the method, which follows either continuously or discontinuously, the graphite webs that are obtained from the continuous pre-compression process with optional post-compression or the plates that are cut or punched out of these webs, are brought into the desired form for use. This stage of the method, which is generally referred to below as reworking, includes a wide variety of processing processes, such as impregnation, coating, partial re-shaping and/or compression of the plates/webs in a cold-press method, trimming, shaping, for example by mechanically processing the webs/plates, embedding heating pipes or wires as well as the production of composite components formed of the heat-conducting plates in accordance with the invention and common building materials.

There is a wide variety of suitable methods available in accordance with the prior art for the production of impregnations and surface coatings. Impregnation can be effected, for example, by using the dipping, spraying or printing method, using the vacuum method or using a combination of vacuum and printing methods as well as in a fluidized bed.

The term coating is understood herein as including all processes that are used to cover the surface of the plate in accordance with the invention, with a layer of a different material. This material can not only be dissolved or dispersed in a fluid, but can also be present in a pulverulent form as well as a planar laminate. Such coatings can be produced, for example, by painting, varnishing, spraying, laminating or rolling-on methods, in which case in these methods, in contrast with the impregnation method, complete saturation of the interior of the plate in accordance with the invention does not take place. In a special embodiment of the invention the components are covered with a plastics melt. This takes place, for example, in a tempered fluidized bed, in an extrusion process or, if the plate size permits it, even in an injection-molding process.

Composites formed between the heat-conducting plates in accordance with the invention and other laminates, such as paper webs, films, metal sheets, wood veneers, non-woven fabrics or planar textile formations or semi-finished building products, such as polystyrene and polyurethane plates, glass-fiber and rock-wool plates, wooden boards, gypsum plaster boards, fireclay bricks, bricks, lime sandstone, pumice, tiles, cellular concrete stones or slabs or LIAPOR stones, are produced by applying adhesives, binding agents, fillers, mortar and building plaster to one or both of the surfaces that are to be connected together or by constructing a form-locking connection between the materials, for example a tongue-and-groove connection or snap connections, such as resilient hooks.

The graphite webs can again be shaped and compressed, over their whole surface through the use of cold-press methods or partially through the use of pairs of rollers or discontinuously through the use of presses. Shaping can be carried out at the same time for compression purposes through the use of embossing rollers, for example to produce grooves or beads, knurls and diamond-shaped knurling or grained surfaces. This can take place both before and after the application of cover layers.

Suitable methods for producing grooves, joints or openings are, for example, cutting, punching, embossing, milling, turning and planing. A particularly preferred method of mechanical processing is water-jet cutting. Alternatively, abrasive particle jets (sand blasts, spherules of frozen $CO_2$) or laser beams can be used for processing.

If applicable, functional components, such as pipes for the distribution of a heat-carrier or heating wires, are also introduced at the reworking stage. Alternatively, this can also take place directly in situ at the construction site.

Reworking is effected discontinuously in particular if coatings are produced from materials or composites with materials that are not available as rolled products, but only as plate products, for example metal sheets or plate products made from cardboard, gypsum and wood. The discontinuous procedure is also necessary if such surfaces that do not yet exist at all in the web obtained directly after compression, such as the end faces of the plates that first develop when cutting the webs/cutting the plates to length, have to be coated or processed in another way. Furthermore, discontinuous reworking allows the work sequences to be separated in time and space.

EXAMPLE 1

A web having a thickness of 25 mm was produced by continuously compressing pulverulent expanded graphite material between two textile bands. A sample that had a length and a width of 30 cm in each case was cut out from this web and the density of this sample was determined. A value of 0.027 g/cm$^3$ was ascertained. Moreover, the specific heat conductivity and the specific electrical resistance of the sample were measured in the x, y and z-direction. The results are compiled in Table 1.

TABLE 1

| Measured variable | x-direction | y-direction | z-direction |
|---|---|---|---|
| Specific electrical resistance/Ω μm | 370 | 600 | 375 |
| Specific heat conductivity W/m*K | 5.7 | 5.5 | 3.4 |

Both the electrical and the heat conductivity have distinct anisotropy. The conduction of heat and electrical current is preferably effected parallel to the plate surface, that is, along the graphite layer planes.

EXAMPLE 2

Figure 2:
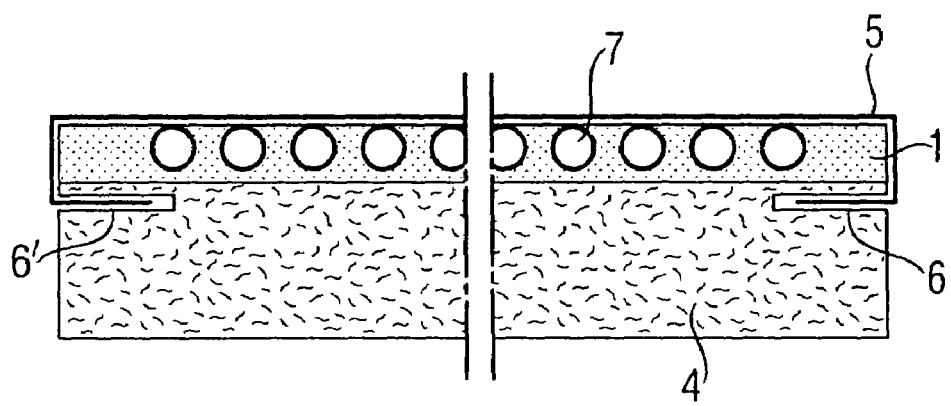
FIG. 2 is a cross-sectional view of a component for an air-conditioning ceiling with the heat-conducting plate in accordance with the invention.
Figure 3:
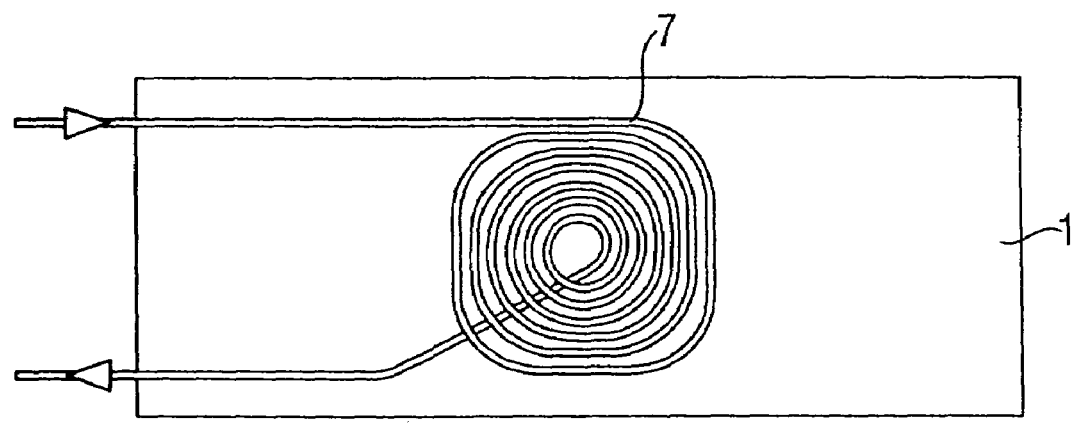
FIG. 3 is a plan view of a heat-conducting plate in accordance with the invention with a heating spiral embedded therein.

Laminated composite components, having a structure which is shown in FIG. 2, were produced with an area of 30×70 cm. The laminated composite included an 18 mm thick molded fiber board 4, a 9 mm thick heat-conducting plate 1 made from compressed expanded graphite material and a 1 mm thick perforated sheet 5. The molded fiber board 4 on the rear side of the heat-conducting plate is used for heat-insulation, and the perforated sheet 5 on the front side is used to improve the visual effect. The molded fiber board and heat-conducting plate were bonded together. The perforated sheet embraces the laminated composite on the longitudinal sides and is held fast through the use of longitudinal slots 6, 6' in the molded fiber board 4. This laminated composite is suitable, for example, for the construction of an air-conditioning ceiling. Embedded in the surface of the heat-conducting plate 1 that is remote from the molded fiber board 4 is a pipe that is wound in the form of an Archimedean spiral 7 (referred to below as a heating spiral 7), has a diameter of 6 mm and is made from plastics material. The pipe is embedded in such a way that it ends so that it is flush with the plate surface. The diameter of the outermost winding of the spiral amounts to 21 cm. The spiral 7 was positioned substantially in the center of the plate 1. In other words, the distance of the outermost winding of the spiral 7 to the right-hand edge of the plate 1 was approximately as great as to the left-hand edge of the plate 1, and the distance of the outermost winding of the spiral to the upper edge of the plate 1 was approximately as great as to the lower edge of the plate 1. FIG. 3 shows this heat-conducting plate 1 in a plan view with the heating spiral 7 embedded therein. For comparison purposes, a laminated composite of the same dimensions was produced that contained, instead of the heat-conducting plate in accordance with the invention, a gypsum plaster board with three heating spirals embedded therein next to one another and of the same size as the heating spiral installed in the graphite plate. Hot water at a temperature of 50° C. flowed through the heating spirals in both test configurations. The change in the temperature distribution on the surfaces of both plates as a function of the duration of the through-flow of hot water was tracked through the use of infrared thermography. At the beginning of the test, both surfaces had a temperature of 25° C.; temperature gradients over the surface could not be identified. The further time characteristics of the change in temperature of the plates in the region surrounded by the heating spiral and in the periphery thereof can be seen in Table 2.

TABLE 2

| | Heating spiral in heat-conducting plate in accordance with the invention | | Heating spiral in gypsum plate | |
|---|---|---|---|---|
| Duration/ min | T/° C. Region surrounded by heating spiral | T/° C. Periphery | T/° C. Region surrounded by heating spiral | T/° C. Periphery |
| 0 | 25 | 25 | 25 | 25 |
| 1:15 | 30–32 | 27–29 | 27–29 | 25 |
| 2:15 | 32–34 | 27–31 | 29–30 | 27–29 |
| 3:45 | 34–36 | 31–34 | 30–33 | 28–30 |
| 8 | 36–37 | 34–36 | 34–36 | 31–33 |
| 15 | 37–39 | 34–37 | 35–37 | 32–34 |

Clearly more rapid heating and more uniform temperature distribution are achieved in the test configuration with the heat-conducting plate in accordance with the invention, due to the high lateral heat conductivity of the expanded graphite, with just one heating spiral, in contrast with the test configuration with a conventional gypsum plate and three heating spirals.

This application claims the priority, under 35 U.S.C. § 119, of German Patent Application 103 41 255.7, filed Sep. 4, 2003; the entire disclosure of the prior application is herewith incorporated by reference.

We claim:

1. A lightweight heat-conducting plate, comprising:
   binder-free compressed expanded graphite material;
   a plate surface having heat conductivity parallel to said plate surface and heat conductivity perpendicular to said plate surface, said heat conductivity parallel to said plate surface being at least 50% higher than said heat conductivity perpendicular to said plate surface; and
   heat conduction elements selected from the group consisting of pipes for distribution of a fluid heat-carrier medium and wires for an electrical heating system.

2. The lightweight heat-conducting plate according to claim 1, wherein said heat conductivity parallel to said plate surface is at least 5.5 W/m*K.

3. The lightweight heat-conducting plate according to claim 1, which further comprises a plate thickness between 8 mm and 50 mm, and a plate material density between 0.01 g/cm$^3$ and 0.4 g/cm$^3$.

4. The lightweight heat-conducting plate according to claim 1, which further comprises a plate thickness between 15 mm and 40 mm.

5. The lightweight heat-conducting plate according to claim 1, which further comprises a plate material density between 0.05 g/cm$^3$ and 0.25 g/cm$^3$.

6. The lightweight heat-conducting plate according to claim 1, which further comprises a plate impregnation.

7. The lightweight heat-conducting plate according to claim 1, which further comprises a material selected from the group consisting of varnish and plastic, at least partly covering at least one plate surface.

8. The lightweight heat-conducting plate according to claim 1, which further comprises a material selected from the group consisting of metal, plastics foil, plastics film, a perforated sheet, a textile flat-shaped article, wood veneer, non-woven fabric and paper, at least partly coating at least one plate surface.

9. The lightweight heat-conducting plate according to claim 1, which further comprises a heat-insulating material at least partly coating at least one plate surface.

10. The lightweight heat-conducting plate according to claim 9, wherein said heat-insulating material contains a material selected from the group consisting of expanded polystyrene, polyurethane, glass wool and rock wool.

11. The lightweight heat-conducting plate according to claim 1, which further comprises a material selected from the group consisting of filler, building-plaster, flooring-plaster, mortar and concrete masses, at least partly coating at least one plate surface.

12. The lightweight heat-conducting plate according to claim 1, which further comprises at least one structural plate element selected from the group consisting of depressions, grooves, beads, knurls, diamond-shaped knurling, grained surfaces, joints and openings.

13. The lightweight heat-conducting plate according to claim 1, which further comprises plate configurations selected from the group consisting of pins, angle irons, hollow punches, hooks, anchors and other configurations for establishing a force-locking or form-locking connection with another lightweight heat-conducting plate or another component.

14. The lightweight heat-conducting plate according to claim 1, wherein said pipes are embedded in said plate surface and have a pipe wall ending flush with said plate surface.

15. The lightweight heat-conducting plate according to claim 1, wherein said pipes are embedded in said plate surface and have a periphery with a portion projecting out from said plate surface like a relief.

16. A composite, comprising:
two lightweight heat-conducting plates according to claim 1 lying one on top of the other, said heat conduction elements being embedded between said two plates.

17. The lightweight heat-conducting plate according to claim 1, wherein said heating wires are embedded in said plate surface.

18. The lightweight heat-conducting plate according to claim 1, wherein said heating wires are laid on said plate surface.

19. A composite component for use in structural engineering, comprising:
at least one lightweight heat-conducting plate according to claim 1, and
at least one further component selected from the group consisting of wooden boards, gypsum plaster boards, fireclay bricks, tiles, cellular concrete stones or slabs, bricks, lime sandstone, pumice, expanded clay stones and clinker.

20. The composite component according to claim 19, which further comprises a material selected from the group consisting of an adhesive, an adhesion-promoter and a binding agent, interconnecting said components.

21. The composite component according to claim 19, wherein said components are connected together in a form-locking manner.

22. A building, comprising:
at least one lightweight heat-conducting plate according to claim 1 used in a system selected from the group consisting of floor-heating systems, ceiling-heating systems, wall-heating systems and air-conditioning ceiling systems, for transmission and dissipation of heat.

23. An automobile, comprising:
at least one lightweight heat-conducting plate according to claim 1 used in a system selected from the group consisting of floor-heating systems, ceiling-heating systems, wall-heating systems and air-conditioning ceiling systems, for transmission and dissipation of heat.

24. A machine, comprising:
at least one lightweight heat-conducting plate according to claim 1 used in a system selected from the group consisting of floor-heating systems, ceiling-heating systems, wall-heating systems and air-conditioning ceiling systems, for transmission and dissipation of heat.

25. An installation, comprising:
at least one lightweight heat-conducting plate according to claim 1 used in a system selected from the group consisting of floor-heating systems, ceiling-heating systems, wall-heating systems and air-conditioning ceiling systems, for transmission and dissipation of heat.

26. A container, comprising:
at least one lightweight heat-conducting plate according to claim 1 used in a system selected from the group consisting of floor-heating systems, ceiling-heating systems, wall-heating systems and air-conditioning ceiling systems, for transmission and dissipation of heat.

27. A building, comprising:
at least one composite component according to claim 19 used in a system selected from the group consisting of floor-heating systems, ceiling-heating systems, wall-heating systems and air-conditioning ceiling systems, for transmission and dissipation of heat.

28. An automobile, comprising:
at least one composite component according to claim 20 used in a system selected from the group consisting of floor-heating systems, ceiling-heating systems, wall-heating systems and air-conditioning ceiling systems, for transmission and dissipation of heat.

29. A machine, comprising;
at least one composite component according to claim 19 used in a system selected from the group consisting of floor-heating systems, ceiling-heating systems, wall-heating systems and air-conditioning ceiling systems, for transmission and dissipation of heat.

30. An installation, comprising:
at least one composite component according to claim 19 used in a system selected from the group consisting of floor-heating systems, ceiling-heating systems, wall-heating systems and air-conditioning ceiling systems, for transmission and dissipation of heat.

31. A container, comprising:
at least one composite component according to claim 19 used in a system selected from the group consisting of floor-heating systems, ceiling-heating systems, wall-heating systems and air-conditioning ceiling systems, for transmission and dissipation of heat.

32. A method for the production of lightweight heat-conducting plates, which comprises the following steps:

compressing continuously supplied expanded graphite material in a pre-compressor between textile bands to form a web; and cutting the web to length into plates according to claim 1 having a desired size.

33. The method according to claim 32, wherein the web has a thickness between 8 mm and 50 mm and a web material density between 0.01 g/cm$^3$ and 0.5 g/cm$^3$.

34. The method according to claim 32, which further comprises subsequently compressing the web obtained in the pre-compressor between pairs of rollers for post-compression, with pre-compression and post-compression constituting a continuous process run.

35. The method according to claim 34, which further comprises combining the step of post-compression between pairs of rollers with application of a coating.

36. The method according to claim 32, which further comprises at least one of impregnating and coating the pre-compressed web, with the steps of compression and at least one of impregnation and coating constituting a continuous process run.

37. The method according to claim 35, which further comprises at least one of impregnating and coating the pre-compressed and post-compressed web, with the steps of compression, post-compression and at least one of impregnation and coating constituting a continuous process run.

38. The method according to claim 32, which further comprises mechanically processing and structuring the webs or the plates cut to length therefrom with a water jet, a laser beam or an abrasive particle jet.

39. The method according to claim 32, which further comprises structuring the webs or the plates cut to length therefrom with embossing rollers.

40. The method according to claim 32, which further comprises shaping and compressing the webs or the plates cut to length therefrom by cold-pressing.

41. The method according to claim 32, which further comprises embedding pipes for distribution of a fluid heat-carrier medium in surfaces of the webs or the plates cut to length therefrom.

* * * * *